(12) United States Patent
Westendorf et al.

(10) Patent No.: US 7,496,598 B2
(45) Date of Patent: *Feb. 24, 2009

(54) SYSTEMS AND METHODS FOR AUTOMATED DATA OBJECT PROCESSING

(75) Inventors: Frank Westendorf, Ubstadt-Weiher (DE); Bent Foss Pedersen, Jyllinge (DK)

(73) Assignee: SAP AG, Walldorf (DE)

( * ) Notice: Subject to any disclaimer, the term of this patent is extended or adjusted under 35 U.S.C. 154(b) by 694 days.

This patent is subject to a terminal disclaimer.

(21) Appl. No.: 10/812,944

(22) Filed: Mar. 31, 2004

(65) Prior Publication Data

US 2004/0193637 A1    Sep. 30, 2004

(30) Foreign Application Priority Data

Mar. 31, 2003  (WO) ............... PCT/EP03/03334
Apr. 30, 2003  (WO) ............... PCT/EP03/04518

(51) Int. Cl.
*G06F 17/30*   (2006.01)

(52) U.S. Cl. ............... 707/103 Y; 707/8; 707/203

(58) Field of Classification Search ............... 707/100, 707/103 R–103 Z, 8, 200, 201, 203; 705/4, 705/38

See application file for complete search history.

(56) References Cited

U.S. PATENT DOCUMENTS

| | | | |
|---|---|---|---|
| 5,855,005 A * | 12/1998 | Schuler et al. ............... | 705/4 |
| 2004/0143464 A1 * | 7/2004 | Houle et al. ............... | 705/4 |
| 2004/0172310 A1 * | 9/2004 | Atlee et al. ............... | 705/4 |
| 2004/0181436 A1 * | 9/2004 | Lange ............... | 705/4 |
| 2005/0038681 A1 * | 2/2005 | Covert ............... | 705/4 |
| 2005/0086084 A1 * | 4/2005 | Dillard ............... | 705/4 |
| 2005/0086156 A1 * | 4/2005 | Conroy et al. ............... | 705/38 |
| 2005/0240451 A1 * | 10/2005 | Johnson et al. ............... | 705/4 |
| 2006/0064330 A1 * | 3/2006 | Sumino et al. ............... | 705/4 |

OTHER PUBLICATIONS

"Tivoli® Workload Scheduler for z/OS™—Planning and Scheduling the Workload", Version 8.1, IBM Corp., Document No. SH19-4546-00, 2001, pp. i-xxx, 1-22, 73-122, 171-212, and 401-428, downloaded from <http://publib.boulder.ibm.com/tividd/td/TWS/SH19-4546-00/en_US/PDF/sh19-4546-00.pdf>.

"UC4: global", Brochure of SBB Software GmBH, 2002, (8 pages), downloaded from <http://www.betasystems.com/e_beta.nsf/pdf/edownloads/$File/UC4_Global_Folder_englisch.pdf>.

* cited by examiner

*Primary Examiner*—Cheryl Lewis
(74) *Attorney, Agent, or Firm*—Finnegan, Henderson, Farabow, Garrett & Dunner, LLP (57) ABSTRACT

Methods and systems are provided for automated processing of data objects. A system for automated processing of data objects may include a computing unit and a data base containing data objects forming process chains of linked data objects. The computing unit may further comprise a selection module allowing for selection of at least one initial data object, a preparation module for identifying at least one process chain containing the initial data object to be processed and for determining all of the data objects which are linked with the selected data object in causal relation, and a process module for processing the determined data objects and the initial data object. Processing performed by the process module may include resetting the determined data objects, executing the desired processing of the initial data object and recalculating consecutively the determined data objects reset in the resetting step being in causal relation with the initial data object.

36 Claims, 7 Drawing Sheets

| Initial case to update | Tasks |
|---|---|
| Case 4 | PARK: 4<br>RESOLVE: 4 |
| Case 3 | PARK: 4, Z3, Z2, 3<br>RESOLVE: 3, Z2, Z3, 4 |
| Case 2 | PARK: 4, Z3, Z2, 3, 2<br>RESOLVE: 2, 3, Z2, Z3, 4 |
| Case 1 | PARK: 4, Z3, Z2, 3, 2, 1<br>RESOLVE: 1, 2, 3, Z2, Z3, 4 |

SYSTEMS AND METHODS FOR AUTOMATED DATA OBJECT PROCESSING

DESCRIPTION OF THE INVENTION

1. Field of the Invention

The present invention generally relates to automated data object processing. More particularly, the invention relates to forming process chains of linked data objects in a data base of a computer system.

2. Background of the Invention

There are many cases and situations in which data objects contained in a data base are linked to each other so as to form process chains, i.e., the data objects linked to each other describe a development or the history of a process or an order of events. In this context, the term "process chain" does not only describe a mere one-dimensional sequence of data objects, but may also relate to higher-dimensional and complex chainings, networkings or meshings (i.e., a complex branch construct).

Figure 1:
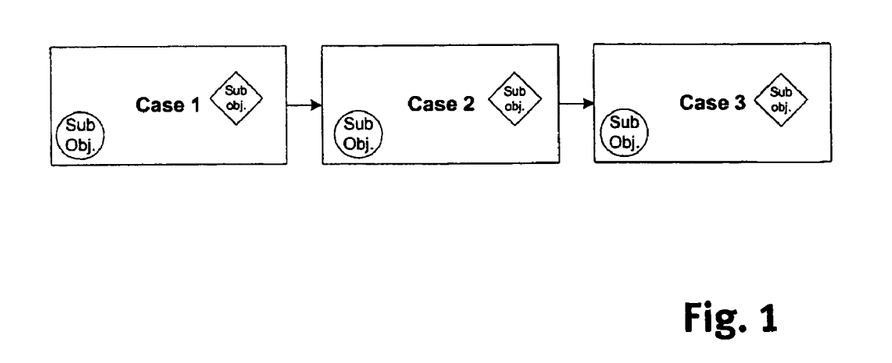
FIG. 1 is a schematic illustration of a conventional data object chain with three data objects, the data objects describing commission cases.

One example for data objects forming process chains of linked data objects, but not limited to, is in the field of calculation and remuneration of commission cases. Commission cases occur in the context of various business fields where employees or agents receive bonus or commission payments on the basis of achieved objects, such as for example in the field of insurance companies, where an employee or agent receives commission payments when he/she sells an insurance policy, etc. However, there are many other areas in sales and services where commission cases are handled. In situations with a complex environment and/or long-term contracts, a whole history of events (commission cases) develops over time which leads to a situation with several data objects, each of which describes a commission case and which are based one on the other over time in a causal relation. In the most simple situation, this relation is a one-dimensional process chain of at least two data objects. As an example, FIG. 1 illustrates a commission case chain with three commission cases forming a one-dimensional process chain with the oldest case (Case 1) depicted on the left hand side and the younger cases (Case 2 and Case 3) placed subsequently along a time axis showing to the right hand side of FIG. 1. Arrows between the respective cases indicate the succession in time.

As can be seen from FIG. 1, each commission case contains respective sub-objects which comprise information of what has been done in the commission case. As sub-objects are independent of the case, they play an important rule when a chain in commission cases has to be updated. The situation illustrated in FIG. 1 could, for example, stand for a life insurance contract which was signed at a given date (Case 1). This led to a commission payment to the employee who sold that life insurance. At a later date, the amount covered by this life insurance was raised which led to a further commission payment to the relevant employee (who could be the same employee as in Case 1 or another employee, e.g., a successor to the employee who sold the insurance in the first place). Again later, the amount was raised again (or any other change to the insurance contract took place) resulting in a third commission payment.

Other, more complex situations may exist. For example, in the case of health insurance, there could be the case of two single persons, each with his or her own health insurance contract, and which might comprise additional benefit agreements (e.g., getting married and having children with contracts getting merged, cancelled, creating subcontracts and eventually new contracts emerging from subcontracts when the children are grown up). Obviously, there are (basically) no limits to complexity.

In a situation where a commission case has to be updated, the whole chain of commission cases has to be updated, too, as remuneration amounts can influence other remuneration amounts as the remuneration amounts depend on the remuneration they correct/influence. Cases with such remunerations have to be considered when a chain of commission cases is updated. In such a case, sub-objects play an important role as they are independent of the case. However, in the systems known from the prior art, it is only possible to update the youngest of the commission cases, i.e., the commission case last posted in the commission case chain.

SUMMARY OF THE INVENTION

In accordance with an aspect of the invention, a data object processing system is provided that allows for fast and reliable updating of process chain data objects, even in very complex process chain branch structures. In accordance with another aspect of the invention, a data object processing system is provided in which the data objects are consistent after processing of an update.

According to one embodiment, a computing unit of a computer system comprises a selection module, a preparation module, and a process module. In addition, a data base is provided that contains data objects forming process chains of linked data objects. The selection module may be adapted to allow for the selection of a data object among the data objects contained in the data base. On the basis of a selected data object, the preparation module may identify at least one process chain containing the selected data object. The preparation module may also determine all of the data objects of the data base which are linked with the selected data object in causal relation. Further, the process module may execute the desired processing of the selected data object and the data object(s) being in causal relation with the selected data object.

In another embodiment, a method is provided that comprises, by way of a non-limiting example, the following steps: identifying, after a data object to be processed has been selected, at least one process chain containing the selected data object to be processed; determining all of the data objects which are linked with the selected data object in causal relation; and processing the determined data objects and the initial data object.

The step of processing may comprise subsequently resetting or cancelling one determined data object after the other and consecutively recalculating, if necessary (i.e., if the determined data object was not cancelled), the determined data objects reset in the resetting step being in causal relation with the selected data object.

In one embodiment, the processing steps are configurable by switches. For example, a user could define that resetting and recalculation of a determined data object is replaced by cancellation.

As exemplary uses of the invention, it is possible to handle automatically deep and complex networks of data objects, such as commission cases, within one single process to resolve pending case queues or to recalculate them in changed context.

Further, the data objects may contain a time index, and the resetting of the determined data objects (as executed by the process module) may start with the data object containing the most resent time index and step back consecutively to the selected data object.

In another embodiment, a computer program is provided with program coding means which are suitable for carrying out a process consistent with the invention, such as described above, when the computer program is run on a computer. The computer program may be stored on a computer-readable medium.

Further features and embodiments of the invention will become apparent from the description and the accompanying drawings.

It will be understood that the features mentioned above and those described hereinafter can be used not only in the combination specified, but also in other combinations or on their own, without departing from the scope of the present invention.

BRIEF DESCRIPTION OF THE DRAWINGS

The accompanying drawings provide a further understanding of the invention and are incorporated in and constitute a part of this specification. The drawings illustrate various embodiments of the invention, and, together with the description, serve to explain the principles of the invention.

In the drawings.

DESCRIPTION OF THE EMBODIMENTS

Figure 2:
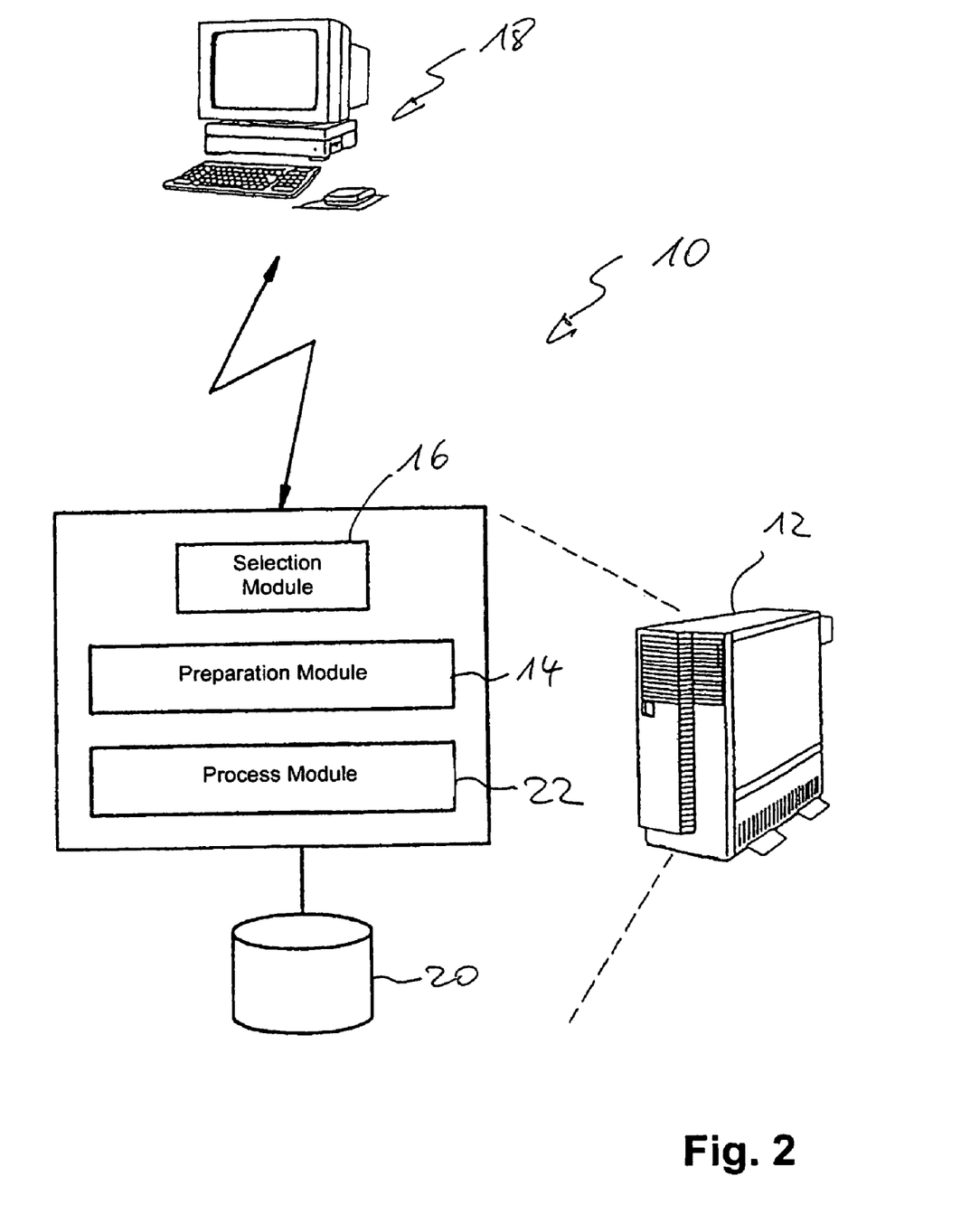
FIG. 2 is a schematic view of an exemplary data object processing computer system, according to an embodiment of the invention.

FIG. 2 shows a schematic block diagram representation of an exemplary data object processing computer system 10, according to an embodiment of the present invention. Computer system 10 may comprise a server or computing unit 12 connected with at least one input/output means 18. A software solution may be installed on computing unit 12 comprising three modules, namely a selection module 16, a preparation module 14 and a process module 22. The computing unit 12 may be connected to a data base 20 on which a plurality of data objects is stored.

Figure 3:
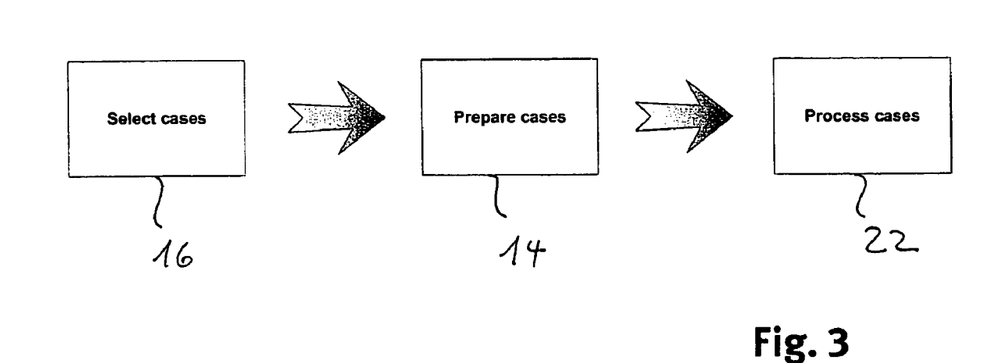
FIG. 3 is a schematic block diagram depicting three exemplary modules of the computer system according to the embodiment of FIG. 2.

FIG. 3 shows an exemplary succession in operation of three modules; that is, selection module 16, preparation module 14 and process module 22 described above.

For purposes of illustration, embodiments of the invention will now be described in more detail in connection with commission cases. It is to be understood that embodiments of the invention can be employed in any other field in which subsequent data objects are linked to each other in a causal relation and influence there contents and/or results. In this context, the term "report" is to be understood as a synonym for "computer program".

According to one embodiment of the invention, selection module 16 may select one or more commission cases that are to be processed, preparation module 14 may prepare the cases by finding additional cases, grouping and sorting them, and process module 22 may process the cases determined before.

Selection module 16 may be a module created depending on the context of its use. The selection module 16 could be a report that is based on some selection criteria that select the cases or it could be a report with a user interface that allows the user to select cases based on certain selection criteria, such as a case ID or all cases posted in a certain period of time, or the like. The selected cases may then be transferred to the preparation module 14.

The preparation module 14 may require a selected list of commission cases as input that is provided by the selection module 16. By way of an example, the list of selected cases (selected data objects) is referred to as the list of initial cases (or initial data objects). The preparation step performed in the preparation module 14 may need to locate additional required cases that need to be processed before the initial selected cases can be processed. For example, in the simple case illustrated in FIG. 1, if case 1 is selected as the initial case, the preparation module 14 would determine that cases 3 and 2 are to be processed before case 1 can be processed.

In one embodiment, the cases determined by the preparation module 14 may be grouped and sorted. The result of this grouping and sorting could be groups of sorted cases that can later be processed independently. As a prerequisite for the parallel processing, the groups may be disjoint.

The result of the preparation in preparation module 14 may be a task list based on the grouped and sorted commission cases which contain a list of instructions on how to handle the cases and which may form the basis for the process module 22 to process the determined commission cases. By way of a non-limiting example, the arrangement within a group is such that a risk-free and consistent processing by the process module according to the application logics is guaranteed. Further, the group may be closed, and if an interruption occurs during processing it can be resumed at the commission case where the interruption occurred.

Also, the preparation module 22 may provide program interfaces to maintain the initial list of commission cases and to start the preparation.

Finally, the process module 22 may process the task list generated and provided by the preparation module 14. In one embodiment, it is possible to start several processing tasks in parallel, each process processing one task list.

The preparation module 14 and/or the process module 22 may each comprise at least one interface. Interfaces for the preparation module 14 are, for example: (i) adding a commission case to the list of initial selected commission cases that have to be processed; and (ii) starting the preparing process (e.g., creating the groups, sorting the cases and creating the task lists). Interfaces for the processing module 22 comprise, for example: (i) maintaining the task list and a list with overall information about the task list; and (ii) controlling a possible parallel process.

In one embodiment, when a commission case is processed, both subsequently posted commission cases in the commission case chain, cases that contain rebundled subobjects and commission cases with correction remunerations, can be taken into account.

Figure 4:
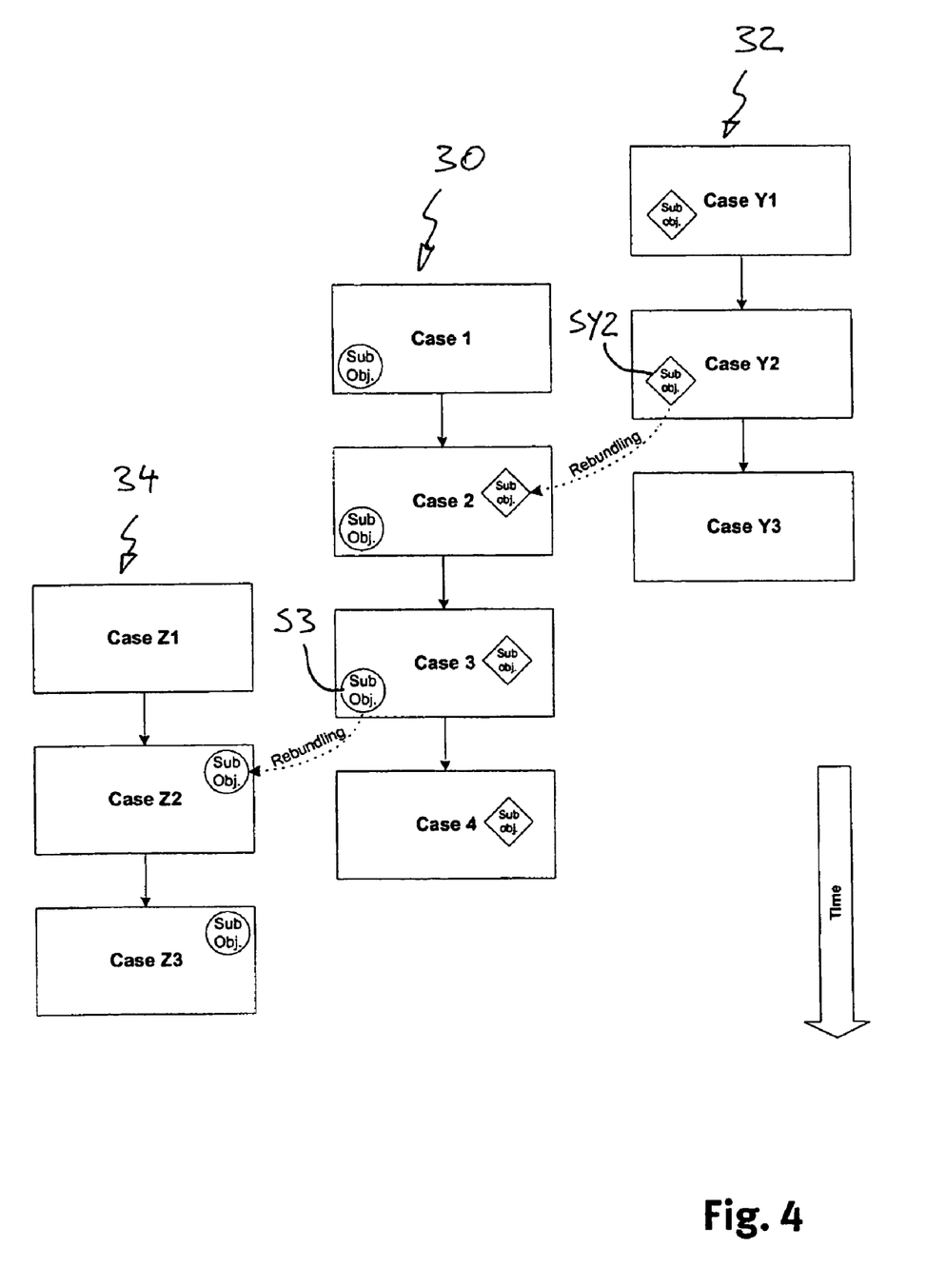
FIG. 4 illustrates, by means of a block diagram, an exemplary processing of linked data object process chains (case chains), according to an embodiment the invention.

Referring now to the exemplary embodiment of FIG. 4, a commission case chain 30 consisting of four commission cases 1 to 4 is shown. As can be seen from the time axis shown on the lower right hand side of FIG. 4, case 1 is the oldest case in commission case chain 30 and case 4 is the youngest case.

Two further exemplary commission case chains 32 and 34 are shown in FIG. 4. Commission case chain 32 comprising cases Y1 to Y3 and commission case chain 34 comprising cases Z1 to Z3. Case Y1 of commission case chain 32 is older than case 1 of commission case chain 30 and case Y2 of commission case chain 32 is younger than case 1 of commission case chain 30. Similarly, case Z1 of commission case chain 34 is older than case 3 of commission case chain 30 and case Z2 of commission case chain 34 is younger than case 3 of commission case chain 30.

Exemplary case 3 contains a sub-object S3 that is rebundled to case Z2 (i.e., case 3 and case Z2 are linked in causal relation). As case Z2 is younger than case 3, this means that case Z2 has to be considered if any of the cases 1 to 3 is selected as an initial case and has to be handled/processed because the valuation for the sub-object S3 could change in case 3 and as a result, the valuations in the cases Z2 and Z3 could change, too. The valuation for an object may contain the history of the case chain development and, thus, may produce a concatenation of the case statuses over the time. The valuation may also serve as basis for the renumeration.

Exemplary case Y2 contains a sub-object SY2 that is rebundled to case 2 (i.e., cases Y2 and 2 are linked in causal relation). However, in this example, this rebundling is of no importance as the valuations in case Y2 (which is older than case 2) may not change as a result of an update/processing of case 2.

Figure 5:
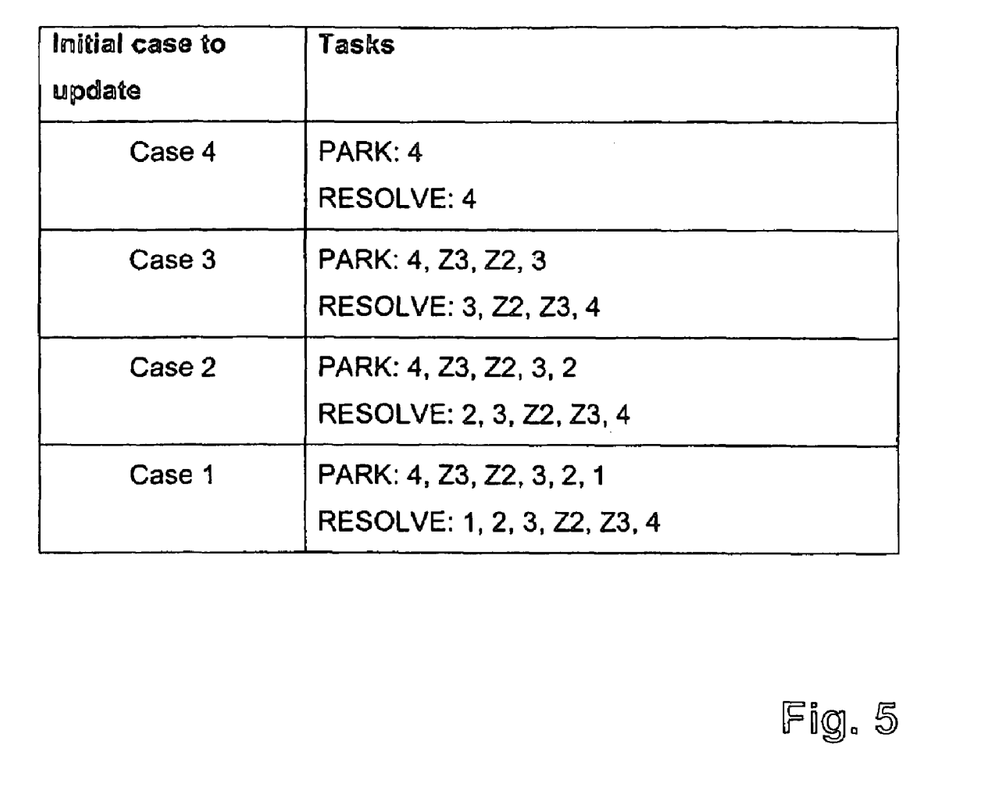
FIG. 5 shows an exemplary table identifying a sequence of case processing.

FIG. 5 shows a exemplary table containing a list of exemplary tasks which may be processed depending on which one of the cases 1 to 4 of commission case chain 30 is selected as an initial case.

By way of an example, the first row identifies the most simple occurrence, i.e., a selection of case 4. As case 4 is the youngest case in commission case chain 30 and not rebundled or linked to any other case, the processing of case 4 comprises parking or locking of case 4 and resolving it.

Should case 3 be selected as initial case, case 4 is parked first and then cases Z3 and Z2 are parked as sub-object S3 is rebundled from case 3 to case Z2. Afterwards, the cases 3, Z2, Z3 and 4 are resolved. Regarding the terminology used herein, "park" is an example for "reset" as defined above and "resolve" is an example for "recalculate" as defined above. Consistent with the invention, a parked case may represent a case that is placed on hold or pending. A parked case may not be treated, particularly there may be no simulation, until it is resolved. A case may be reset by taking the case out of the commission case for at least a period of time (roll back a case that is not an initial case) for the purpose of keeping it out of the line so that no changes or recalculations can occur. A reset (or parked) case can, when it is resolved, either be set to an initial state, cancelled or recalculated.

If case 2 is selected as initial case, cases 3 and 2 are parked first. Then, case 2 is resolved, and then case 3 is resolved as described above.

If case 1 is selected as initial case, case 2 has to be parked first as described above. Then case 1 is resolved, and then case 2 is resolved as described above.

By way of an example, if there is a remuneration amount in the current case that is corrected by a remuneration amount calculated in another case, that case has to be considered, too. The reason is that if the remuneration in the current commission case changes then the correction remuneration might change, too, and therefore the commission case has to be taken into account.

Figure 6:
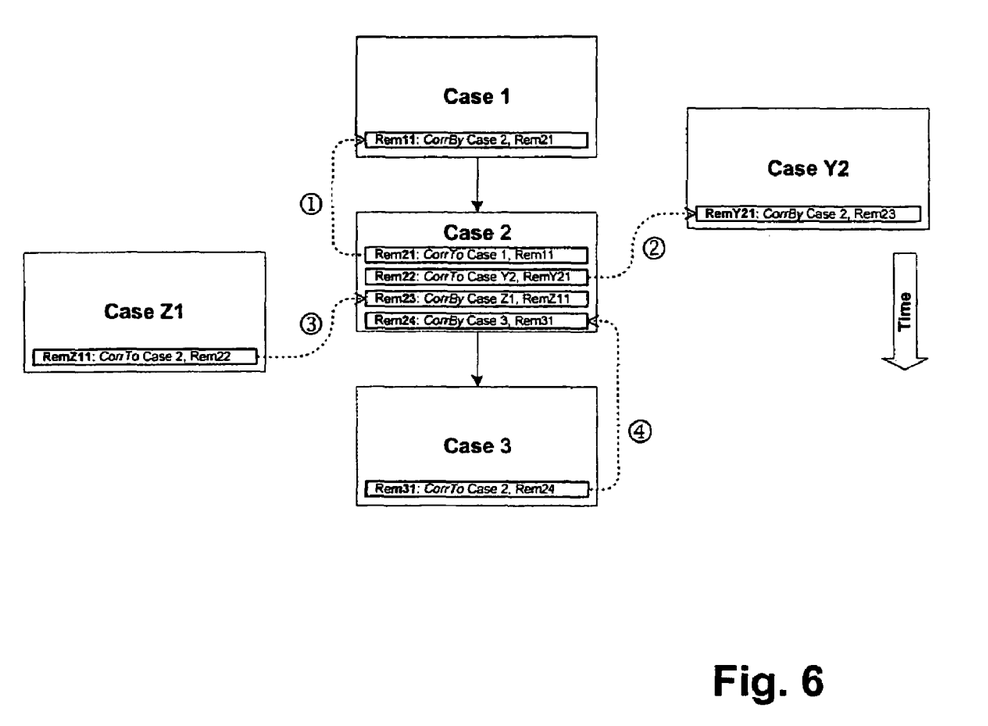
FIG. 6 is a schematic illustration of exemplary processing situations.

FIG. 6 shows four exemplary situations of remuneration corrections, commission case 2 being the case examined. By way of non-limiting examples, the situations indicated with dashed arrows and reference numerals ① and ② are both situations where a remuneration in case 2 corrects/influences a remuneration from another commission case, i.e., case 1 in situation ① and case Y2 in situation ②. These situations do not have to be dealt with because the results of cases 1 and Y2 do not change when case 2 changes. The situations depicted by dashed arrows with reference numerals ③ and ④ indicate situations where a remuneration amount is corrected by a remuneration amount that is part of another commission case, i.e., cases 3 in situation ④ and case Z1 in situation ③. If the remuneration amount in commission case 2 changes, then the correcting remuneration amount could change too. Therefore, these cases have to be dealt with in the same task list and they have to be located/determined during the preparation in preparation module 14.

As described above, the process according to embodiments of the invention may comprise the three modules, including selection module 16, preparation module 14 and process module 22. Selection module 16 provides preparation module 14 with the one or more selected cases. After the preparation module 14 has determined additional cases, grouped and sorted the cases and generated the task list, the task list may be provided to process module 22 and may be processed by the process module.

By way of example, preparation module 14 may receive a list of initial commission cases provided by selection module 16, which list may contain the commission cases that need to be processed. The preparation module 14 may then perform the following steps of locating/determining and grouping additional cases, sorting cases inside a group and generating a task list. The step of locating may consist of locating additional commission cases that need to be processed before the initial selected case(s) can be processed. All additional commission cases may be placed in the same group as the initial case. The commission cases may then be sorted into the right order within a given group in order to ensure that the cases are processed in the correct order.

Figure 7:
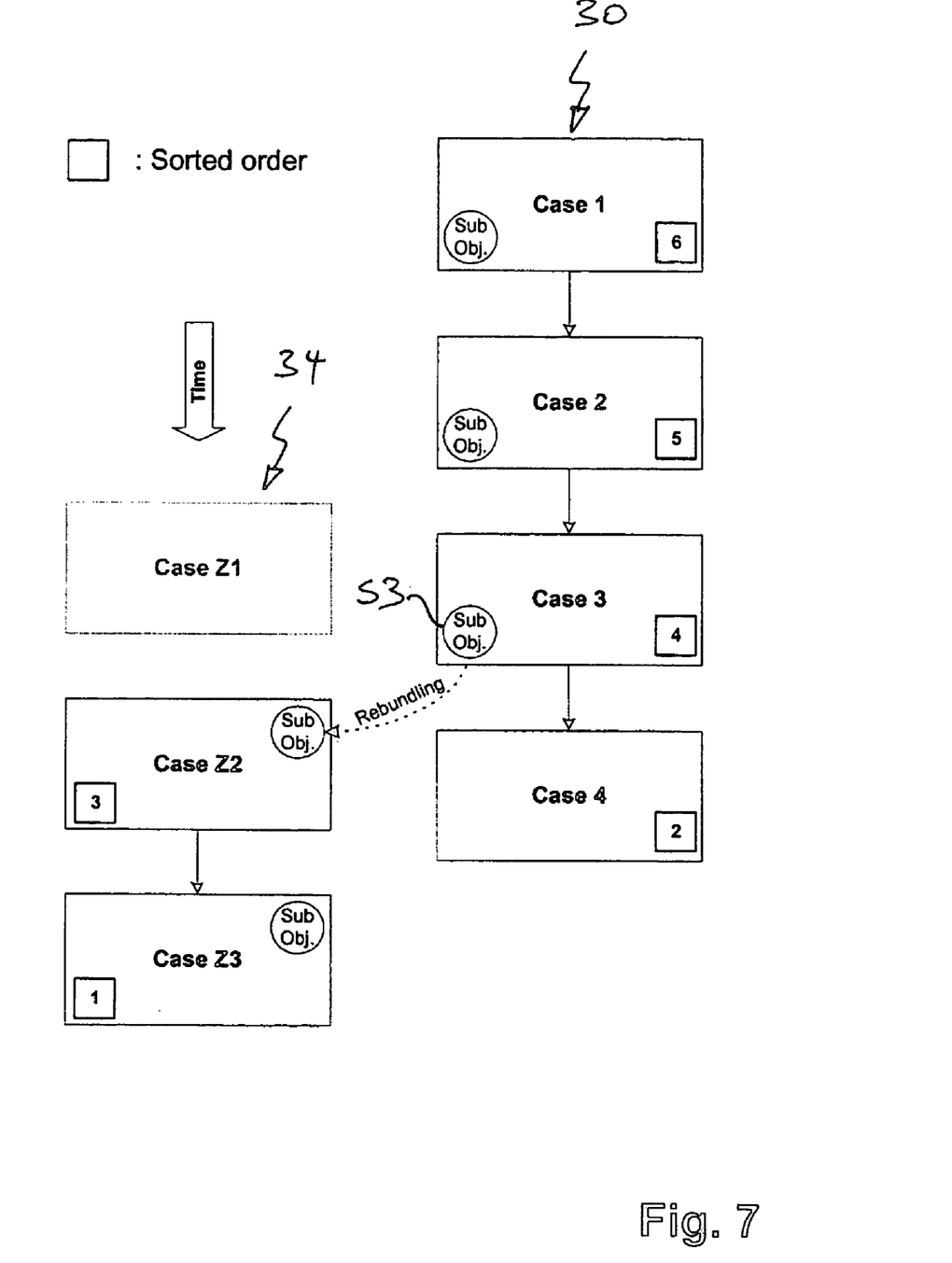
FIG. 7 is a schematic block diagram representation illustrating exemplary sort order processing.

A exemplary sorting step is illustrated in the exemplary embodiment of FIG. 7. In this example, FIG. 7 again shows commission case chains 30 and 34 of FIG. 4, exemplary case 3 of commission case chain 30 being linked to exemplary case Z2 of commission case chain 34 due to the rebundled sub-object S3. The exemplary situation shown in FIG. 7 corresponds to exemplary case 1 of commission case chain 30 being selected as initial case. In the first step of preparation module 14, the additional exemplary cases 2, 3, 4, Z2 and Z3 were determined as cases to be processed. Exemplary case Z1 not having to be processed as it is older than case 3 and thus older than the linkage between case 3 and case Z2, and there is no influence from a change of case 3 or case Z2 on case Z1 (cf FIG. 5).

In the next step the cases may be sorted in an order in which they can be processed, i.e., first parked and then resolved. An exemplary sort order is indicated in FIG. 7 by means of numbers 1 to 6 in squares. As can be seen from FIG. 7, case Z3 is the first case parked, then case 4 is parked, followed by case Z2 and cases 3 to 1. This may correspond to the "age" of each case, the age of a case being advantageously determined by a time index contained in each data object. Thus, the sort order indicated in FIG. 7 may start with the data object containing the most recent time index (here: case Z3) and then step back consecutively to the selected data object case 1. When resolving or recalculating the cases, the given sort order may be processed in reverse order, i.e., case 1 is processed first, followed by cases 2 and 3, then case Z2, followed by cases 4 and Z3.

Alternatively, another sort order could start with the most recent, i.e., youngest case in the direct line of the selected case which would be case 4 in the situation shown in FIG. 7, followed by the subsequent order cases in the same line except such an older subsequent case would be linked to another line. This is the situation for exemplary case 3 in FIG. 7 being linked to case Z2 of the line of commission case chain 34. Therefore, case 3 is not the next case in the sort order but the most recent case in the parallel commission case chain 34 which is case Z3, followed by all the subsequent older cases until the case is reached which is linked to the previous line or chain. Then the sort order is continued in the initial line, i.e., with cases 3 to 1. This sort order is given in row 4 of FIG. 5. Obviously, sorting is illustrated by means of rather low complex process chains, but it should be obvious that the principles laid down above according to the invention can be applied to much more complex data object chain networks with a plurality of links due to rebundled subobjects.

As a next step, the task list to be provided to the process module 22 may be generated in preparation module 14 based on the grouped and sorted list of commission cases. An exemplary complete task list is illustrated in FIG. 8, the numbers depicted in FIG. 8 giving the previously described order of parking and resolving the cases.

Figure 8:
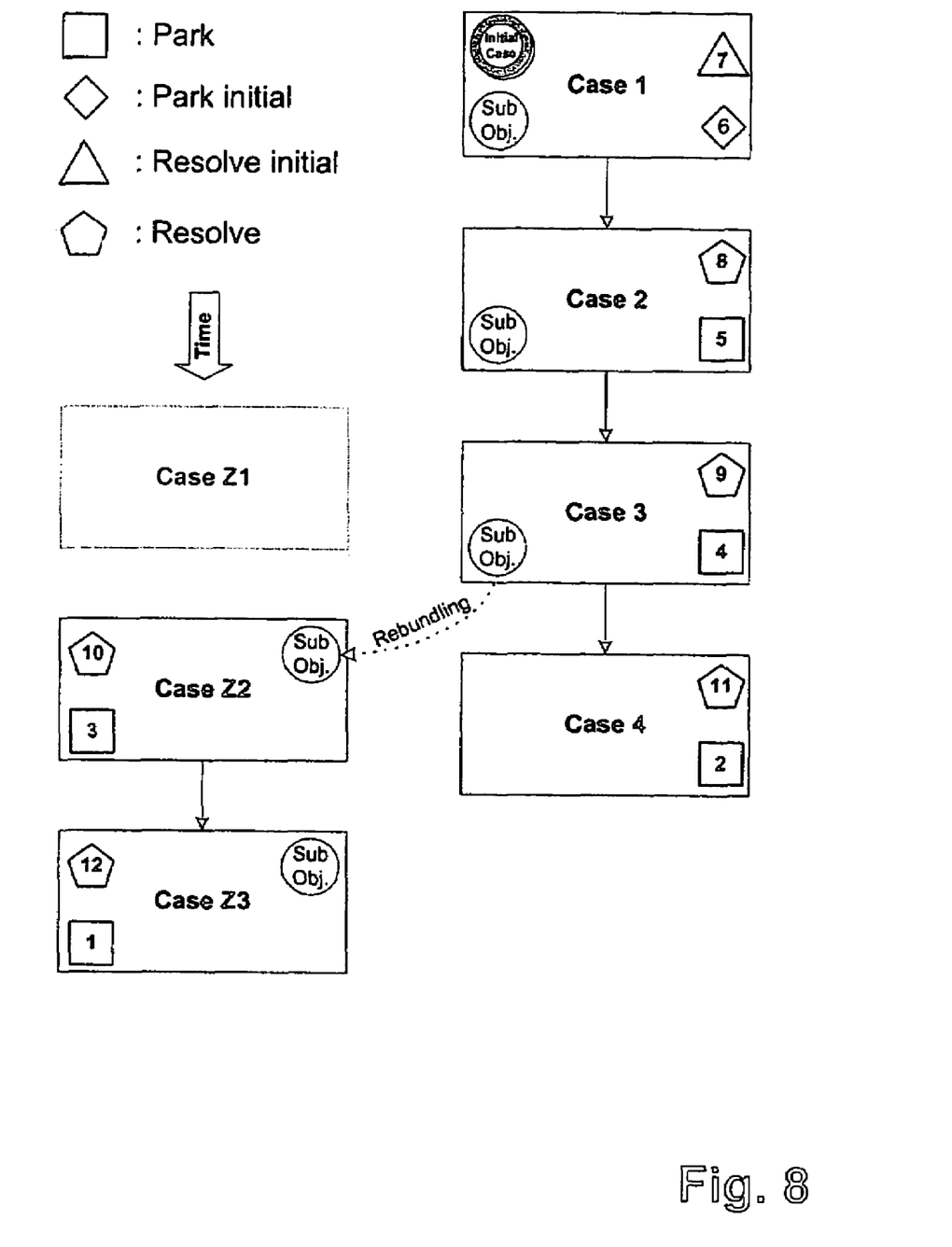
FIG. 8 is a representation according to FIG. 7 with additional exemplary sorting indications.

In the example of FIG. 8, exemplary case Z3 is parked first, then cases 4, Z2, 3, 2 and finally case 1. Case 1 is resolved and then the rest of the cases are resolved in the reverse order in which they were parked.

The order of the parking may be the same as the order of the sorted cases of FIG. 7. The commission cases may be added to the task list and signed the action park, except for the initial case which is signed the action park initial. The cases may then be copied in the reverse order to the task list and at the same time assigned the action resolve, except for the initial case which may be signed the action resolve initial.

Thus, it is possible to handle very large amounts of data. Exemplary embodiments of the invention may differentiate multiple processing types, support parallel administration of processes and/or protect mass processing against each other and against single processing.

Obviously, more than one data object may be selected as initial case and therefore, a grouped list can comprise more than one initial case which also applies to the task lists so that the actions park initial and resolve initial can occur more than once in a task list.

The process module 22 may then processes the cases as specified in the task list. If more than one task list exists, each disjoined, it is possible to process two or more task lists in parallel.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed:

1. A method performed by a computer system for processing data objects that describe developments of business transactions, the method comprising:
   selecting an initial data object to be updated;
   identifying a first process chain of the initial data object, wherein the first process chain comprises a series of linked data objects, including the initial data object, and wherein the linked data objects each describe developments of a common business transaction at different points in time;
   determining related data objects that are dependent upon changes to the initial data object, wherein the related data objects comprise linked data objects from the first process chain that are later in time than the initial data object;
   updating the related data objects and the initial data object, wherein the updating further comprises;
   locking real-time access of the related data objects;
   updating the initial data object; and
   updating the related data objects while locked from real-time access; and
   storing the related data objects and the initial data object in a database accessible by the computer system.

2. The method of claim 1, wherein the related data objects further comprise linked data objects from a second process chain that are later in time than the initial data object, and that are dependent upon changes to the initial data object.

3. The method of claim 1, wherein the data objects are locked from real-time access upon selection of the initial data object until termination of the updating.

4. The method of claim 1, wherein the determining further comprises grouping and sorting the related data objects.

5. A method performed by a computer system for processing data objects that describe developments of business transactions, the method comprising:
   selecting an initial data object to be updated;
   identifying a first process chain of the initial data object, wherein the first process chain comprises a series of linked data objects, including the initial data object, and wherein the linked data objects each describe developments of a common business transaction at different points in time;
   determining related data objects that are dependent upon changes to the initial data object, wherein the related data objects comprise linked data objects from the first process chain that are later in time than the initial data object;
   updating the related data objects and the initial data object, wherein the updating further comprises;
   cancelling at least one of the related data objects; and
   updating the initial data object; and
   storing the related data objects and the initial data object in a database accessible by the computer system.

6. The method of claim 5, wherein the related data objects further comprise linked data objects from a second process chain that are later in time than the initial data object, and that are dependent upon changes to the initial data object.

7. The method of claim 5, wherein the data objects are locked from real-time access upon selection of the initial data object until termination of the updating.

8. The method of claim 5, wherein the determining further comprises grouping and sorting the related data objects.

9. A method performed by a computer system for processing data objects that describe developments of business transactions, the method comprising:
   selecting an initial data object to be updated;
   identifying a first process chain of the initial data object, wherein the first process chain comprises a series of linked data objects, including the initial data object, and wherein the linked data objects each describe developments of a common business transaction at different points in time;
   determining related data objects that are dependent upon changes to the initial data object, wherein the related data objects comprise linked data objects from the first process chain that are later in time than the initial data object;

updating the related data objects and the initial data object, wherein the data objects comprise a time index, and wherein the updating updates the related data objects in reverse chronological order, starting with a related data object with a most recent time index and ending with the initial data object, and storing the related data objects and the initial data object in a database accessible by the computer system.

10. The method of claim 9, wherein the related data objects further comprise linked data objects from a second process chain that are later in time than the initial data object, and that are dependent upon changes to the initial data object.

11. The method of claim 9, wherein the data objects are locked from real-time access upon selection of the initial data object until termination of the updating.

12. The method of claim 9, wherein the determining further comprises grouping and sorting the related data objects.

13. A computer system comprising:
a database comprising data objects that describe developments of business transactions; and
a computing unit comprising:
a selection module for selecting an initial data object to be updated;
a preparation module for identifying a first process chain of the initial data object, wherein the first process chain comprises a series of linked data objects, including the initial data object, and wherein the linked data objects each describe developments of a common business transaction at different points in time, and wherein the preparation module further determines related data objects that are dependent upon changes to the initial data object, wherein the related data objects comprise linked data objects from the first process chain that are later in time than the initial data object; and
a process module for updating the related data objects and the initial data object and for storing the related data objects and the initial data object in a database, further wherein the process module is for locking real-time access of the related data objects, updating the initial data object, and updating the related data objects while locked from real-time access.

14. The computer system of claim 13, wherein the related data objects further comprise linked data objects from a second process chain that are later in time than the initial data object, and that are dependent upon changes to the initial data object.

15. The computer system of claim 13, wherein the data objects are locked from real-time access upon selection of the initial data object until termination of the updating.

16. The computer system of claim 13, wherein the preparation module further comprises grouping and sorting the related data objects.

17. A computer system comprising:
a database comprising data objects that describe developments of business transactions; and
a computing unit comprising:
a selection module for selecting an initial data object to be updated;
a preparation module for identifying a first process chain of the initial data object, wherein the first process chain comprises a series of linked data objects, including the initial data object, and wherein the linked data objects each describe developments of a common business transaction at different points in time, and wherein the preparation module further determines related data objects that are dependent upon changes to the initial data object, wherein the related data objects comprise linked data objects from the first process chain that are later in time than the initial data object; and
a process module for updating the related data objects and the initial data object and for storing the related data objects and the initial data object in a database, further wherein the process module is for cancelling at least one of the related data objects, and updating the initial data object.

18. The computer system of claim 17, wherein the related data objects further comprise linked data objects from a second process chain that are later in time than the initial data object, and that are dependent upon changes to the initial data object.

19. The computer system of claim 17, wherein the data objects are locked from real-time access upon selection of the initial data object until termination of the updating.

20. The computer system of claim 17, wherein the preparation module further comprises grouping and sorting the related data objects.

21. A computer system comprising:
a database comprising data objects that describe developments of business transactions; and
a computing unit comprising:
a selection module for selecting an initial data object to be updated;
a preparation module for identifying a first process chain of the initial data object, wherein the first process chain comprises a series of linked data objects, including the initial data object, and wherein the linked data objects each describe developments of a common business transaction at different points in time, and wherein the preparation module further determines related data objects that are dependent upon changes to the initial data object, wherein the related data objects comprise linked data objects from the first process chain that are later in time than the initial data object; and
a process module for updating the related data objects and the initial data object and for storing the related data objects and the initial data object in a database, wherein the data objects comprise a time index, and further wherein the process module is for updating the related data objects in reverse chronological order, starting with a related data object with a most recent time index and ending with the initial data object.

22. The computer system of claim 21, wherein the related data objects further comprise linked data objects from a second process chain that are later in time than the initial data object, and that are dependent upon changes to the initial data object.

23. The computer system of claim 21, wherein the data objects are locked from real-time access upon selection of the initial data object until termination of the updating.

24. The computer system of claim 21, wherein the preparation module further comprises grouping and sorting the related data objects.

25. A computer program stored on a computer-readable storage medium containing instructions, that, when executed on at least one processor, cause the at least one processor to perform a method, the method comprising:
selecting an initial data object to be updated;
identifying a first process chain of the initial data object, wherein the first process chain comprises a series of linked data objects, including the initial data object, and wherein the linked data objects each describe developments of a common business transaction at different points in time;

determining related data objects that are dependent upon changes to the initial data object, wherein the related data objects comprise linked data objects from the first process chain that are later in time than the initial data object;

updating the related data objects and the initial data object, wherein the updating further comprises:
locking real-time access of the related data objects;
updating the initial data object; and
updating the related data objects while locked from real-time access; and storing the related data objects and the initial data object in a database accessible by the at least one processor.

26. The computer program of claim 25, wherein the related data objects further comprise linked data objects from a second process chain that are later in time than the initial data object, and that are dependent upon changes to the initial data object.

27. The computer program of claim 25, wherein the data objects are locked from real-time access upon selection of the initial data object until termination of the updating.

28. The computer program of claim 25, wherein the determining further comprises grouping and sorting the related data objects.

29. A computer program stored on a computer-readable storage medium containing instructions, that, when executed on at least one processor, cause the at least one processor to perform a method, the method comprising:

selecting an initial data object to be updated;
identifying a first process chain of the initial data object, wherein the first process chain comprises a series of linked data objects, including the initial data object, and wherein the linked data objects each describe developments of a common business transaction at different points in time;

determining related data objects that are dependent upon changes to the initial data object, wherein the related data objects comprise linked data objects from the first process chain that are later in time than the initial data object;

updating the related data objects and the initial data object, wherein the updating further comprises:
cancelling at least one of the related data objects; and
updating the initial data object; and storing the related data objects and the initial data object in a database accessible by the at least one processor.

30. The computer program of claim 29, wherein the related data objects further comprise linked data objects from a second process chain that are later in time than the initial data object, and that are dependent upon changes to the initial data object.

31. The computer program of claim 29, wherein the data objects are locked from real-time access upon selection of the initial data object until termination of the updating.

32. The computer program of claim 29, wherein the determining further comprises grouping and sorting the related data objects.

33. A computer program stored on a computer-readable storage medium containing instructions, that, when executed on at least one processor, cause the at least one processor to perform a method, the method comprising:

selecting an initial data object to be updated;
identifying a first process chain of the initial data object, wherein the first process chain comprises a series of linked data objects, including the initial data object, and wherein the linked data objects each describe developments of a common business transaction at different points in time;

determining related data objects that are dependent upon changes to the initial data object, wherein the related data objects comprise linked data objects from the first process chain that are later in time than the initial data object;

updating the related data objects and the initial data object, wherein the data objects comprise a time index, and wherein the updating updates the related data objects in reverse chronological order, starting with a related data object with a most recent time index and ending with the initial data object;

storing the related data objects and the initial data object in a database accessible by the at least one processor.

34. The computer program of claim 33, wherein the related data objects further comprise linked data objects from a second process chain that are later in time than the initial data object, and that are dependent upon changes to the initial data object.

35. The computer program of claim 33, wherein the data objects are locked from real-time access upon selection of the initial data object until termination of the updating.

36. The computer program of claim 33, wherein the determining further comprises grouping and sorting the related data objects.

* * * * *

UNITED STATES PATENT AND TRADEMARK OFFICE
CERTIFICATE OF CORRECTION

PATENT NO. : 7,496,598 B2
APPLICATION NO. : 10/812944
DATED : February 24, 2009
INVENTOR(S) : Frank Westendorf and Bent Foss Pedersen It is certified that error appears in the above-identified patent and that said Letters Patent is hereby corrected as shown below:

Cover page, first column, "Notice" section, please remove the following phrase:

"This patent is subject to a terminal disclaimer."

Signed and Sealed this

Fourth Day of May, 2010

David J. Kappos
*Director of the United States Patent and Trademark Office*